United States Patent Office 3,446,189
Patented May 27, 1969

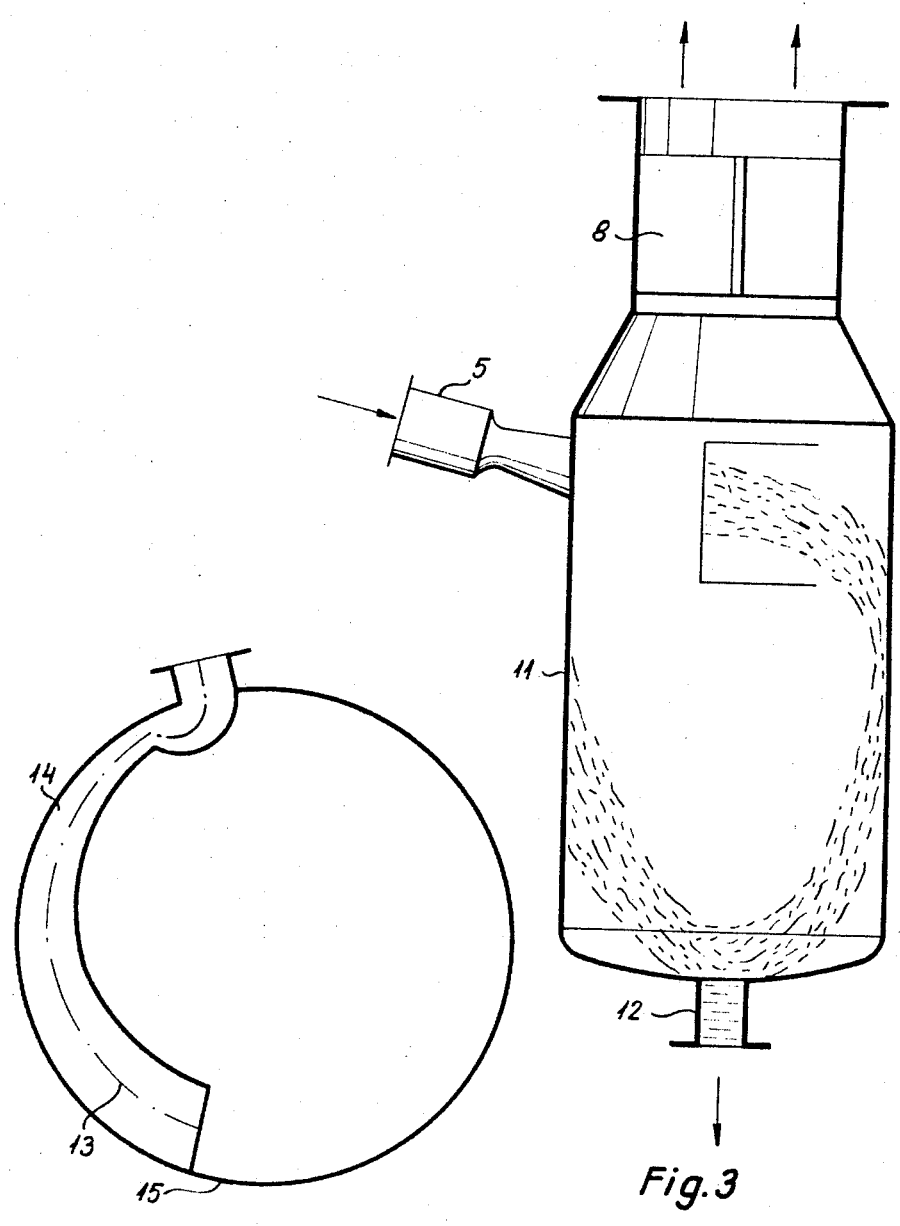

3,446,189
APPARATUS FOR FLASH-EVAPORATING LIQUIDS
Laszlo Szucs, Csaba Tarnadi, and Tamas Kornyey, Budapest, Hungary, assignors to Chemokomplex la Gep es Berendezes Export-Import Vallalat, Budapest, Hungary
Filed Feb. 20, 1967, Ser. No. 617,356
Int. Cl. F22b *3/04*
U.S. Cl. 122—40                                      4 Claims

ABSTRACT OF THE DISCLOSURE

Apparatus for flash-evaporating liquids in which at least one nozzle is connected to a separator vessel having the form of a solid of revolution so as to open thereinto. The nozzle has a convergent section in which liquid is brought to saturation pressure and a subsequent divergent section in which the liquid is expanded and forms a vapor. The divergent section opens into the vessel to cause the vapor to form a vortex therein while any liquid droplets which remain are centrifugally separated and discharged at an outlet which is remote from the outlet for the vapor.

---

This invention relates to apparatus for flash-evaporating liquids.

Flash-evaporation of liquids is frequently required in technological and energy-generating processes. The flashing itself may be for different purposes, e.g. conversion into vapor state of a certain proportion of a liquid in order to generate energy, to produce vapor for heating, cooling of the liquid, to obtain a pure solvent if the liquid is a solution, such as sea-water desalting, condensing a solution, or various combinations of the above mentioned processes. The general problem encountered is that of obtaining, in an apparatus as small as possible, a dry and substantially liquid-free vapor, whose pressure is not less than the saturation pressure of the evaporated liquid.

A number of installations have already been proposed for solving the problems outlined above; these, however, suffer from the drawbacks either that they are very large, or that the vapor obtained entrains a high proportion of liquid, so that the pressure of the vapor obtained is substantially reduced by the required droplet separation.

A known installation consists of large capacity vessels in which the escape velocity of the vapor from the liquid surface is low, while the large vapor space, owing to the low flow velocity of the vapor therein, allows the precipitation or separation of the liquid droplets. By suitable dimensioning of the apparatus, an entrainment separator is not required, since the entrainment of droplets is negligible, and the pressure of the vapor obtained equals the saturation pressure of the evaporated liquid. This installation has the great disadvantage of being very large and costly under normal operating conditions.

A modified version of the above installation is also known, in which small vessels are employed. In this case, however, the vapor obtained contains fine droplets, necessitating the provision of an entrainment separator. Although the installation is relatively small and produces dry vapor, the vapor pressure is lower than the saturation pressure of the liquid, owing to the presence of the entrainment separator.

In another known apparatus, liquid is introduced into the vapor space of a so-called flash-box through orifices or short straight nozzles, terminating sometimes in short cones opening under a wide angle.

In this case, a jet of liquid is instantly dispersed for the major part, in fine droplets by the generally large volume of vapor flashing from the jet. The larger droplets settle out, in the vessel, while the vapor containing fine droplets is passed through an entrainment separator.

This system suffers from the same drawback as the one previously described, in that owing to the use of the entrainment separator, the pressure of the vapor obtained is lower than the saturation pressure of the liquid.

In addition to all these disadvantages, the known installations have the common drawback that the energy liberated on expansion of the liquid is expanded in dispersing the jet of liquid in fine droplets, so that the separation of the vapor and liquid phases can be effected only either in large and therefore expensive installations or in installations which reduce the pressure of the vapor obtained and thus also its saturation temperature below the value prevailing in the flash-box, i.e. in installations consuming additional energy.

The present invention relies on exploiting the energy liberated during the pressure-reduction for accelerating the phases formed during the expansion and for separating these phases from each other and the vapor obtained can be slightly compressed if required. The invention is based on the observation that expansion of the liquid to tbe flash-evaporated in a suitably selected and constructed nozzle to the desired pressure, and then forcing the obtained well-oriented, high-velocity liquid-vapor jet, which hardly contains small droplets to describe a circular or helical trajectory, without any other intermediate operation, produces substantially complete separation of the two phases.

According to the invention there is provided apparatus for flash-evaporating liquids, comprising a droplet separator vessel having the form of a solid of revolution and at least one nozzle connected to the separator vessel either directly or by at least one guide surface, each nozzle having a convergent-divergent cross-section.

Specific embodiments of the invention will now be described by way of example with reference to the accompanying drawings in which:

FIGURE 3 is a longitudinal section of a further embodiment, and

FIGURE 4 is a cross-sectional view of another embodiment comprising a curved nozzle.

Figure 1:
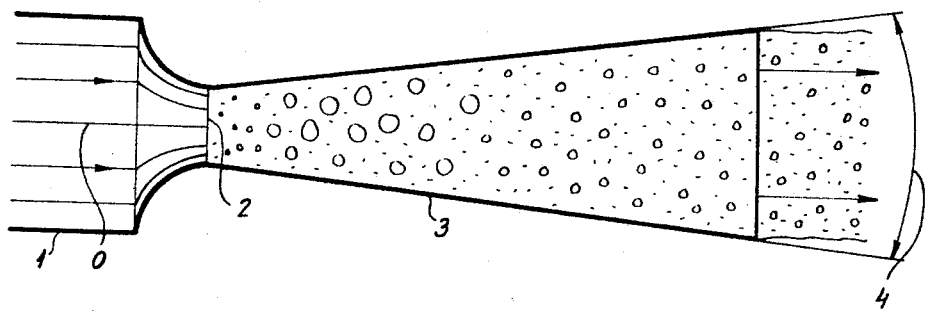
FIGURE 1 is a cross-section through a nozzle suitable for the apparatus according to the invention.

A nozzle as shown in FIGURE 1 has a divergent section 3 the angle 4 of which is less than 30°, preferably from 8° to 15°, in order to obtain a well arranged liquid-vapor jet. The operation of the nozzle is as follows. Liquid to be vaporized is fed from conduit 1 into the nozzle, where it is brought to saturation pressure by the time it reaches the narrowest section 2. At this point, bubbles of vapor are produced. During expansion of the liquid from the pressure prevailing in section 2 to the desired pressure the volume of the flowing medium is multiplied and the evaporation of the liquid is completed. Although the flow velocity of the medium increases owing to the reduction of pressure, the flow volume rises faster than the velocity, for which reason section 3 of the nozzle is divergent and is so dimensioned that the pressure of the medium is reduced therein almost practically to the desired flashing pressure.

If the liquid-vapor jet produced in the nozzle is deflected by, a plate for example, the liquid, owing to its higher inertia retains its direction, impacts on the plate, and is thus separated from the vapor. The space contiguous with the nozzle is expediently so constructed, that the vapor forms a high-intensity vortex space. The energy necessary for maintaining it is supplied by the incoming high-velocity jet. The vortex space also effects centrifugal separation of any droplets of liquid still present in the vapor.

Figure 2:
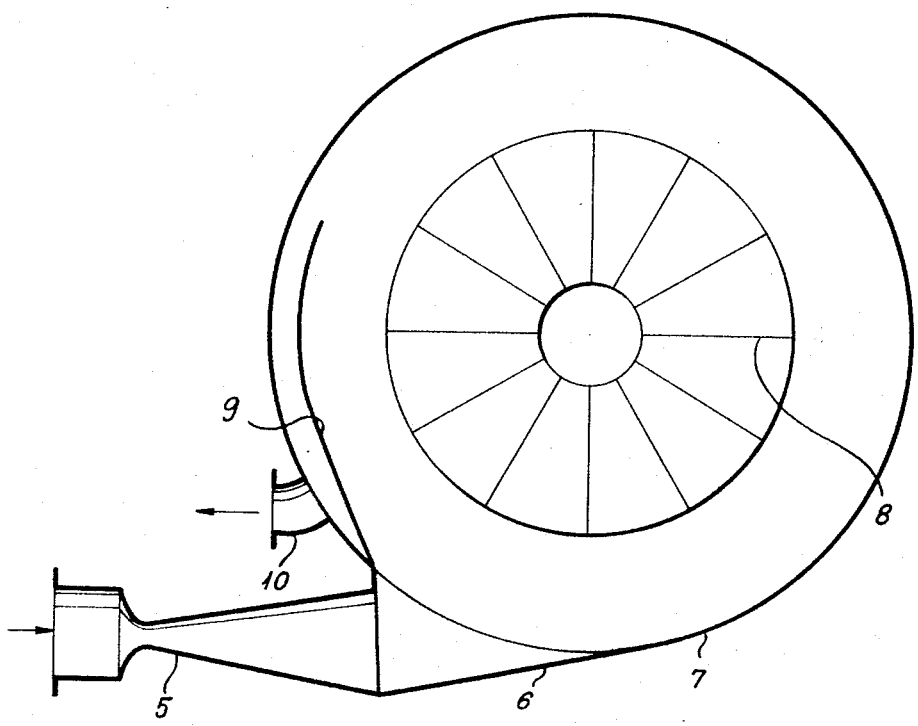
FIGURE 2 is a cross-sectional view of one embodiment of the apparatus according to the invention.

In FIGURE 2, the nozzle is shown opening into a cylinder 7 tangentially or at an angle not greater than 10° above a guide vane 6. Cylinder 7 is provided with a liquid-trapping plate 9 and an outlet 10 for removing the liquid. To regain a part of the kinetic energy of the vortex, a guide-wheel 8 of known construction is arranged in the cylinder 7 and is coaxial therewith.

In this arrangement, a liquid-vapor jet expanding in nozzle 5 is directed towards the guide surface 6. The liquid impacts on the guide surface and the vapor separates from the liquid towards the center of cylinder 7. In the arrangement of FIGURE 2, a vortex moving counter-clockwise is formed in cylinder 7, and the liquid which is still contained in the vapor drawn into the vortex is separated from the vapor by centrifugal action.

It is very important to prevent the liquid jet from impacting against the guide surface at a steep angle, since in this case reflection of the jet may occur. For this reason, the guide surface 6 should form a tangential or almost tangential continuation of cylinder wall 7.

The liquid completes almost one revolution in the cylinder 7, whereupon it is trapped behind the plate 9 and withdrawn through outlet 10.

In the embodiment of FIGURE 3 the nozzle 5 is connected to cylinder 11 in the manner previously described. In this embodiment the liquid moves from nozzle 5 along a helical trajectory, on the surface of the cylinder wall. It then passes into the vortex zone in the lower portion of the cylinder, whereafter it is evacuated through the outlet 12. A guide wheel 8 is also provided, through which the vapor leaves the vortex zone.

The above described embodiments may prove unsuitable in certain instances since the nozzle projects from the cylinder and thus does not permit compact construction. Where a compact construction is of primary importance, a nozzle 14 according to FIGURE 4 is constructed. The axis 13 of the nozzle is curved so that said nozzle can be arranged within cylinder 15. In this embodiment, the separation of the two phases commences in the nozzle, a velocity-differential being formed between liquid and vapor, leading to a greater angular momentum in the vortex space of the cylinder 15 and thus to improved separation of the liquid from the vapor.

In a nozzle having a curved axis, the conditions of flow—especially in the case of small pressure drop—are often such, that the nozzle will ensure an orderly flow even in those cases where the divergent sections have been omitted, i.e. where the expansion is effected in a curved extension element having constant cross-section instead of the divergent section. This features a further possibility of simplifying the construction as a whole.

The vapor flowing through the vortex zone has a considerable kinetic energy. It is advantageous to exploit this energy to increase the pressure of the outgoing vapor. To this end, the arrangements according to the invention comprise the guide wheel 8. Since the outgoing vapor is in most cases subsequently condensed in a condenser, the temperature gradient increases in the condenser connected to the apparatus.

Since in general in the installations wherein the invention is likely to be applied, the economic balance is a very important consideration, the temperature increases obtainable, of some tenths of a degree centigrade, are also of great importance.

The apparatus according to the invention can of course be equipped with a guide surface connected to several nozzles, or with several guide surfaces belonging to the same vortex cylinder.

As will be appreciated from the foregoing, the dimensions of the apparatus according to the invention are relatively small, but nevertheless allow proper separation of liquid droplets from vapor. For example the dimensions of the apparatus may be only just greater than those of a steam exhaust pipe. The vapor obtained is substantially dry, since the centrifugal force produces better droplet separation than was hitherto possible. In the known installations droplet separation took place either at the expense of the energy derived from a drop in vapor pressure, or by an increase in the dimensions of the vessel. However, in the apparatus according to the invention, a considerable amount of energy is derived from the expansion of the liquid, whereas this energy was wasted in the known installations. Further, in the apparatus according to the invention the vapor is not subjected to any separate throttling, as can be gathered from the foregoing description, but rather, owing to the partial exploitation of the rotational energy, the vapor pressure may even be increased beyond the saturation pressure of the flash-evaporated liquid.

The weight and volume of the apparatus according to the invention is generally only 5–15% of that of the proposed arrangements for a given output and vapor quality.

What we claim is:

1. Apparatus for flash-evaporating liquids comprising a droplet separator vessel having an annular surface in the form of a solid of revolution, and at least one nozzle supported within said vessel and having an axis which is curved such that the nozzle rests against the inner surface of the vessel, said nozzle having a convergent section in which the liquid is brought to saturation pressure, and a divergent section continuing directly from the convergent section and in which the liquid is expanded and forms a vapor, said divergent section opening directly into said vessel to cause the vapor to form a vortex therein while any liquid droplets are centrifugally separated, and means in said vessel for separate recovery of vapor and separated liquid.

2. Apparatus as claimed in claim 1 wherein said divergent section has walls with an angle of divergence of less than 30°.

3. Apparatus as claimed in claim 2 wherein the angle of the walls of said divergent section is between 8 and 15°.

4. Apparatus as claimed in claim 1 wherein said nozzle opens into said vessel at an angle between 0° and 10°.

References Cited

UNITED STATES PATENTS

| | | | |
|---|---|---|---|
| 2,010,859 | 8/1935 | Huet | 122—488 |
| 2,271,634 | 2/1942 | Fletcher et al. | 122—488 X |
| 2,411,186 | 11/1946 | Boeckeler. | |
| 2,413,717 | 1/1947 | Kerr | 122—491 X |

CHARLES J. MYHRE, *Primary Examiner.*